(12) United States Patent
Hummel

(10) Patent No.: US 7,020,271 B2
(45) Date of Patent: Mar. 28, 2006

(54) RING CONTROL DEVICE

(76) Inventor: Barbara Isabel Hummel, 4966 State Rd. 414, Burdett, NY (US) 14818-9729

( * ) Notice: Subject to any disclaimer, the term of this patent is extended or adjusted under 35 U.S.C. 154(b) by 89 days.

(21) Appl. No.: 10/459,533

(22) Filed: Jun. 12, 2003

(65) Prior Publication Data
US 2004/0252824 A1  Dec. 16, 2004

(51) Int. Cl.
H04M 1/00 (2006.01)
H04M 3/00 (2006.01)

(52) U.S. Cl. .................. 379/376.02; 379/373.01; 379/375.01; 379/376.01; 379/421

(58) Field of Classification Search ........... 379/376.02
See application file for complete search history.

(56) References Cited

U.S. PATENT DOCUMENTS

| | | | | |
|---|---|---|---|---|
| 4,383,138 A | * | 5/1983 | Castro et al. | 379/361 |
| 4,405,839 A | * | 9/1983 | Groff | 379/188 |
| 4,480,154 A | * | 10/1984 | Klee | 379/376.02 |
| 4,674,115 A | | 6/1987 | Kaleita et al. | 379/201 |
| 4,932,050 A | * | 6/1990 | Davidson et al. | 379/211.02 |
| 5,604,797 A | * | 2/1997 | Adcock | 379/376.02 |
| 5,799,062 A | * | 8/1998 | Lazzara et al. | 379/51 |
| 5,930,351 A | * | 7/1999 | Lappen et al. | 379/376.02 |
| 6,021,176 A | | 2/2000 | McKendry et al. | 379/35 |
| 6,298,122 B1 | | 10/2001 | Horne | 379/93.09 |
| 6,400,814 B1 | * | 6/2002 | Adams | 379/142.01 |

* cited by examiner

Primary Examiner—Sinh Tran
Assistant Examiner—Ramnandan Singh
(74) Attorney, Agent, or Firm—Min, Hsieh & Hack LLP (57) ABSTRACT

A system and method that allows a ringer of a telephone to be silenced on demand without preventing outgoing calls to be placed. In an embodiment of the invention, there is a ring control device comprising a switch, a voltage control device in electrical series with the switch, and a first plug for receiving a first electrical signal, the first electrical signal comprising a first voltage and a second voltage, the first plug disposed in series with and before the voltage control device. The ring control device also includes a second plug for outputting at least one of the first and second voltages of the first electrical signal, the second plug disposed in series with and after the switch. In the ring control device, the voltage control device prevents one of the first and second voltages from passing to the second plug when the switch is in a predetermined position.

20 Claims, 5 Drawing Sheets

RING CONTROL DEVICE

DESCRIPTION OF THE INVENTION

1. Field of the Invention

The subject matter of this application relates to controlling the ringer on a telephone. More particularly, the subject matter of this application relates to a method and a device for controlling when a telephone will ring.

2. Background of the Invention

Many people are interrupted or woken up by a ringing telephone. One solution people often resort to is to not answer the telephone between certain times even though the telephone may be ringing. For example, it is not uncommon for families to have a policy not to answer the telephone during dinner. This solution only solves the problem of not having to speak to people on the telephone. However, the telephone still rings, which can be disturbing in and of itself.

Another solution is to unplug all of the telephones within earshot. One major drawback with this solution, however, is that many people forget to plug the telephone back in. Additionally, unplugging the telephone makes it inoperable for outgoing calls or for incoming emergency calls.

Both of these solutions are inadequate. What is needed is a system that can prevent a telephone from ringing during certain times without having to resort to unplugging the telephone. At the same time, it would be useful to be able to make outgoing telephone calls even though the telephone will not ring. Further, it would also be useful to be able to have the telephone ring in response to emergency telephone calls.

SUMMARY OF THE INVENTION

In an embodiment of the present invention, there is a ring control device comprising a switch and a voltage control device in electrical series with the switch. The ring control device also includes a first plug for receiving a first electrical signal, the first electrical signal comprising a first voltage and a second voltage and the first plug disposed in series with and before the voltage control device. The ring control device further includes a second plug for outputting at least one of the first and second voltages of the first electrical signal, the second plug disposed in series with and after the voltage control device. In the ring control device, the voltage control device prevents one of the first and second voltages from passing to the second plug when the switch is in a predetermined position.

In another embodiment of the present invention, there is a communication system comprising a telephone, wherein the telephone has a ringer. The communication system also includes a switch that is in electrical communication with the telephone and a voltage control device in electrical series with the switch. The communication system also includes a first plug for receiving a first electrical signal in series with and before the voltage control device. The electrical signal comprises a first and second voltage. The communication system further includes a second plug for outputting at least a portion of the electrical signal in series with and after the voltage control device. In the communication system, the voltage control device prevents one of the first and second voltages from passing to the ringer when the switch is in a predetermined position.

In another embodiment of the present invention, there is a method of controlling a ringer on a telephone, the method comprising the step of providing an enablement switch, the enablement switch having at least two positions. The method also includes receiving an incoming electrical signal with a first plug, wherein the incoming electrical signal comprises a first voltage less than 40 V and a second voltage greater than 40 V. The method further includes blocking the second voltage from communicating with a second plug when the enablement switch is in a predetermined position and permitting an outgoing electrical signal received by the second plug to communicate with the first plug when the enablement switch is in the predetermined position.

In another embodiment of the present invention, there is a ring control device that includes an electric signal processor in series with and before a voltage control device. The electric signal processor is capable of identifying a breakthrough code. The electrical signal processor is also configured to permit a first electrical signal to pass to a plug when the first electrical signal includes the breakthrough code when the ring control device is enabled.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1A:
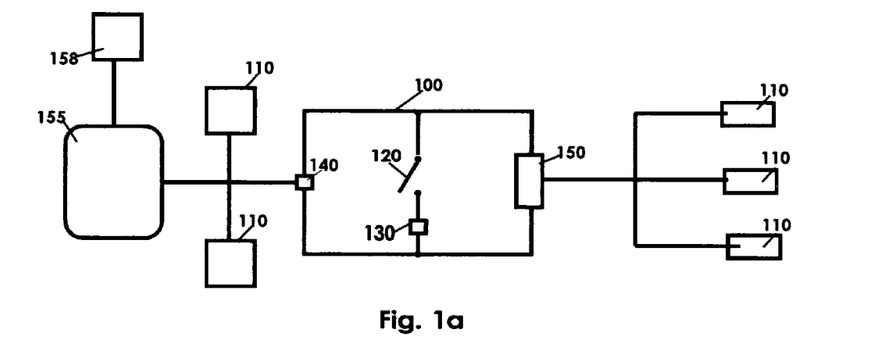
FIG. 1*a* is a ring control device according to one embodiment of the present invention.

An embodiment of the present invention is shown in FIG. 1*a*, which is a ring control device 100 to control the ringer on a telephone 110. It is to be understood that telephone 110 refers to one or more telephones 110. In an embodiment, telephone 110 can be in series with ring control device 100. In this embodiment, telephone 110 can be either before or after ring control device 100. In another embodiment, telephone 110 can be in parallel with ring control device 100.

Ring control device 100 comprises a switch 120 and a voltage control device 130 that is electrically in series with and before switch 120. In different embodiments (not shown), voltage control device 130 can be disposed after switch 120. Ring control device 100 also includes a first plug 140 in series with and before voltage control device 130 and a second plug 150 in series with and after voltage control device 130.

In the embodiment shown in FIG. 1a, first plug 140 receives an incoming communication signal from a telephone network 155 in the form of an incoming electrical signal. The source of the incoming electrical signal can be a caller 158 wishing to communicate with a user of telephone 110.

As will be known to one of ordinary skill in the art, the incoming electrical signal from a telephone network typically comprises a first voltage, herein called a communication voltage, and a second voltage, herein called a ring control voltage. The communication voltage is used to facilitate communication between users on different ends of the network and the ring control voltage controls the ringer on the telephone.

A first person wanting to communicate over a telephone network picks up the receiver of a first telephone and dials a telephone number of a second telephone. This sends an electrical signal, comprising the communication voltage and ring control voltage, across the network from the first telephone to the second telephone. The electrical signal is routed to the ringer of the second telephone and the ring control voltage causes the ringer of the second telephone to ring. In certain cases, the ring control voltage is received in pulses, with each pulse causing the telephone to provide a ring event. Answering the second telephone creates an open circuit for the ring control voltage and the telephone stops ringing. Also, the communication voltage is routed to the portion of the second telephone that controls the communication signal. When the first person talks into a microphone on the first telephone, the first telephone converts the voice of the first person into an electrical signal that is transmitted across the telephone network. The second telephone then converts the electrical signal into an audible signal.

Typically, the ring control voltage is different, and may be greater than the communication voltage. Further, the incoming electrical signal typically comprises a 20 Hz maximum alternating current. In an embodiment of the present invention, the communication voltage may be less than about 40 V while the ring control voltage may be greater than about 40 V. In another embodiment, the communication voltage may be less than about 30 V while the ring control voltage may be greater than about 60 V.

Using ring control device 100, however, the incoming electrical signal can be routed to voltage control device 130. When switch 120 is in a predetermined position, such as the on position, the ring control voltage is prevented from reaching the ringer on telephone 110. However, when switch 120 is in the off position, the ring control voltage is routed to telephone 110.

While not intending to be limited to any particular electronic circuit, in an embodiment of the present invention, voltage control device 130 comprises a Zener diode to prevent the ring control voltage from passing to telephone 110 and to allow the communication voltage to pass to telephone 110. The Zener diode is designed to permit voltages equal to or less than the communication voltage to pass and to prevent voltages greater than the communication voltage to pass. In another embodiment, voltage control device 130 uses a capacitor to prevent the ring control voltage from passing and to allow the communication voltage to pass. In certain embodiments, voltage control device 130 consists essentially of a Zener diode. However, voltage control device may be other electronic devices capable of allowing a first voltage to pass while preventing a second voltage from passing, as will be known to one of ordinary skill in the art.

Switch 120 is used to enable ring control device 100. In one embodiment, switch 120 can be a mechanical switch that a user can set in various positions. For example, the user can set switch 120 to an on position or to an off position, thereby enabling device 100 to turn on and off. Turning switch 120 to the on position completes the circuit path from first plug 140 to second plug 150 and then to telephone 110.

As an illustrative example, the ringer of telephone 110 may be controlled by voltages greater than the predetermined voltage, of for example, 60 V. Thus, when switch 120 is in the on position, the ring control voltage, which is greater than 60 V, is blocked from being routed to the ringer on telephone 110, and the ringer does not ring. However, because voltage control device 130 permits voltages less than the predetermined voltage to pass, a user of telephone 110 can make an outgoing call and interact with other systems, such as another telephone or the internet. When the user makes an outgoing call, second plug 150 receives an outgoing electrical signal, which is not blocked by voltage control device 130, and is routed to first plug 140. The outgoing electrical signal is then routed through telephone network 155 and is received by the system of the intended telephone number.

Further, when switch 120 is in the off position, the incoming electrical signal is routed from first plug 140 to second plug 150 and then to telephone 110. In this configuration, switch 120 serves to sever the circuit path that includes voltage control device 130.

In another embodiment of the invention, switch 120 can include a timer (not shown). Activating the timer can assist in routing the electrical signal to voltage control device 130. The timer can be set to prevent the ringer on telephone 110 from ringing for a predetermined period of time or during predetermined times throughout the day. A user can set the timer to prevent telephone 110 from ringing for any length of time. For example, the timer can be used to prevent telephone 110 from ringing from 9:00 PM until 9:00 AM while the user is sleeping. Or, the timer can be used to prevent the telephone from ringing from 6:00 PM to 8:00 PM, this being the time the user eats dinner. It is to be understood that the time periods described are for illustrative purposes only.

In certain embodiments, switch 120 can be a mechanical switch combined with a timer. In this case, the timer is activated when the mechanical switch is set to the predetermined position. Further, switch 120 can be remotely switched to different positions. For example, ring control device 100 may include a signal receiving device (not shown) capable of receiving infrared (IR) or radio frequency (RF) signals. For example, the signal receiving device may consist essentially of a photo diode. The signal receiving device is electrically connected to switch 120. A user can remotely turn ring control device 100 on and off using a wireless device that emits an IR or RF signal. In any case, switch 120 is used to turn device 100 on and off.

Figure 1B:
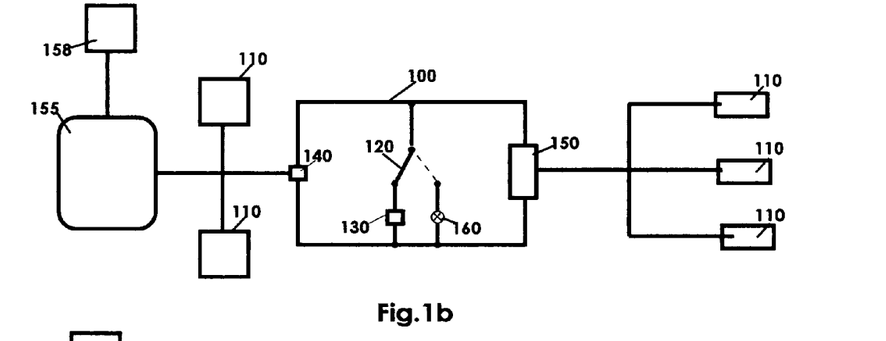
FIG. 1*b* is a ring control device according to another embodiment of the present invention.
Figure 1C:
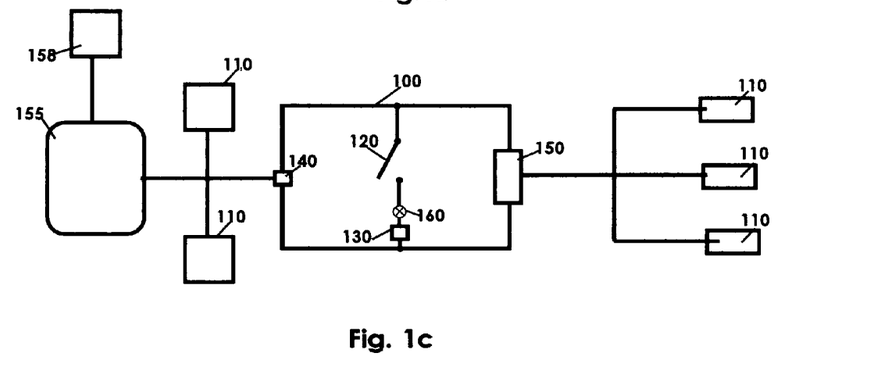
FIG. 1*c* is a ring control device according to another embodiment of the present invention.

In certain embodiments, ring control device 100 includes an indicator light 160, such as a light emitting diode (LED) or incandescent light bulb, as shown in alternative configurations of FIGS. 1b and 1c. In the embodiment shown in FIG. 1b, indicator light 160 is placed in parallel with voltage control device 130. In this embodiment, switch 120 completes the electric circuit that includes either voltage control device 130 or indicator light 160. For example, when switch 120 is placed in the off position, indictor light 160 is illuminated and the ring control voltage is routed to telephone 110. However, when switch 120 is in the on position, an electrical circuit is established which includes voltage control device 130 but not indicator light 160. In this case, the ring control voltage will be prevented from passing to telephone 110.

FIG. 1c shows an alternative embodiment of the present invention where indicator light 160 is in series with voltage control device 130. In this configuration, indicator light 160 is illuminated when switch 120 is in the on position. Accordingly, a user will understand that telephone 110 is prevented from ringing when indicator light 160 is illuminated.

Ring control device 100 may also include a second indicator light (not shown) that becomes illuminated when voltage control device 130 prevents the ring voltage from passing to telephone 110. This second indicator light may also be an LED or incandescent light and may be a different color than indicator light 160.

In embodiments of the present invention that use a Zener diode or a capacitor to allow a first voltage to pass while preventing a second voltage from passing, no external or internal power source is required. In these embodiments, ring control device 100 uses the current supplied by telephone network 155 as a power source for any element requiring electricity.

Often an answering machine is used together with a telephone. Conventional answering machines permit the ring control voltage to pass to the ringer on a telephone. Additionally, conventional answering machines permit the telephone to ring for a predetermined number of times before the answering machine interrupts the electrical signal. Upon interrupting the electrical signal, the answering machine typically plays a prerecorded message and records a message from an incoming caller.

Figure 2:
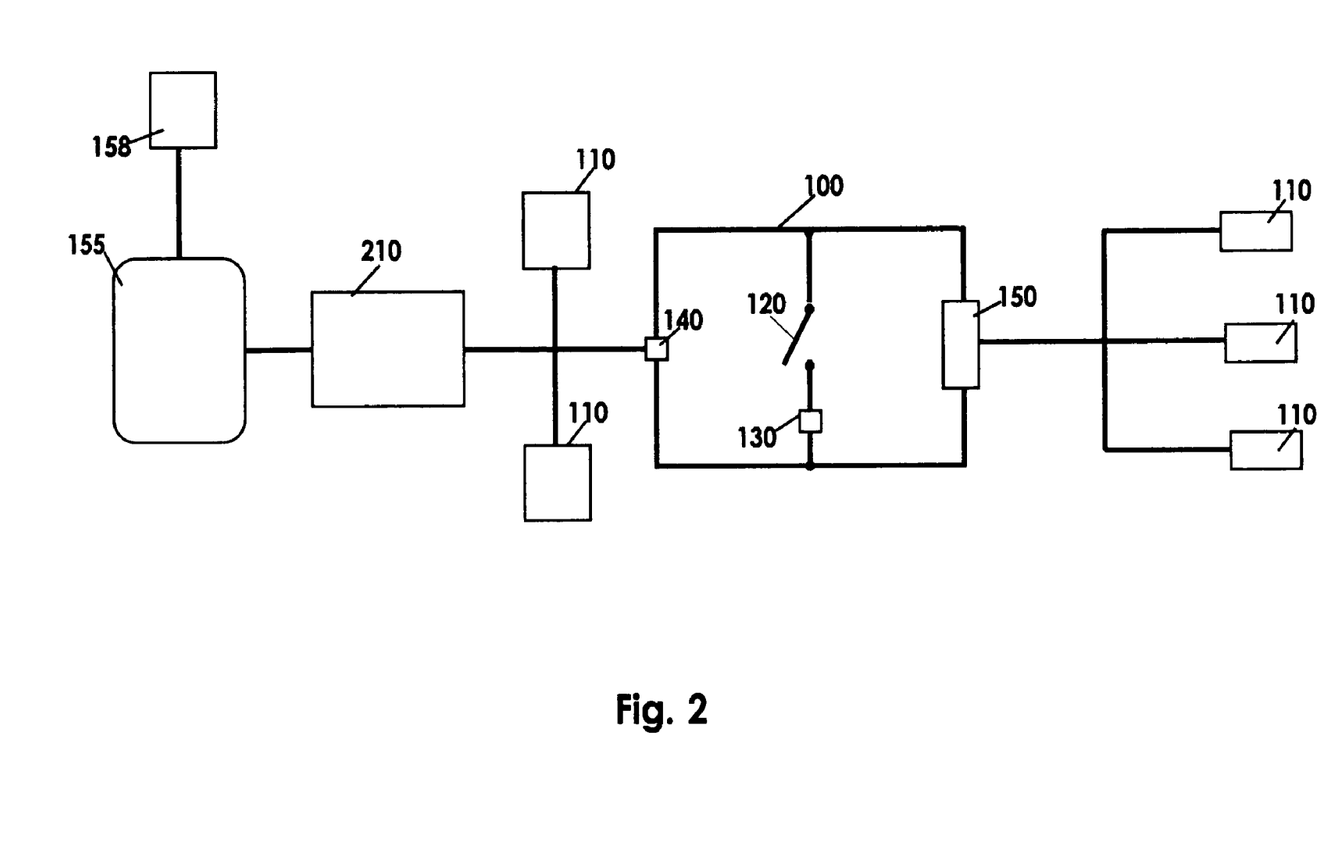
FIG. 2 is a communication system according to another embodiment of the present invention.

In contrast, FIG. 2 shows a communication system 200 according to another embodiment of the present invention. Communication system 200 includes ring control device 100 and an answering machine 210. Communication system 200 may also include telephone 110. In an embodiment, telephone 110 can be in series with ring control device 100. In this embodiment, telephone 110 can be either before or after ring control device 100. In another embodiment, telephone 110 can be in parallel with ring control device 100. In any case, answering machine 210 is disposed before ring control device 100. In operation, answering machine 210 permits the ring control voltage to pass. However, ring control device 100 prevents the ring control voltage from passing to telephone 110 when switch 120 is in the on position. Similar to the embodiments shown in FIGS. 1a–1c, voltage control device 130 prevents the ring control voltage from passing to telephone 110 while at the same time, allowing the communication voltage to pass. Further, answering machine 210 monitors the ring control voltage and interrupts the electrical signal after a predetermined period of time. Accordingly, answering machine 210 can interrupt the electrical signal, play a prerecorded message, and record a message from an incoming caller without permitting telephone 110 to ring and a user being interrupted by a ringing telephone.

Figure 3:
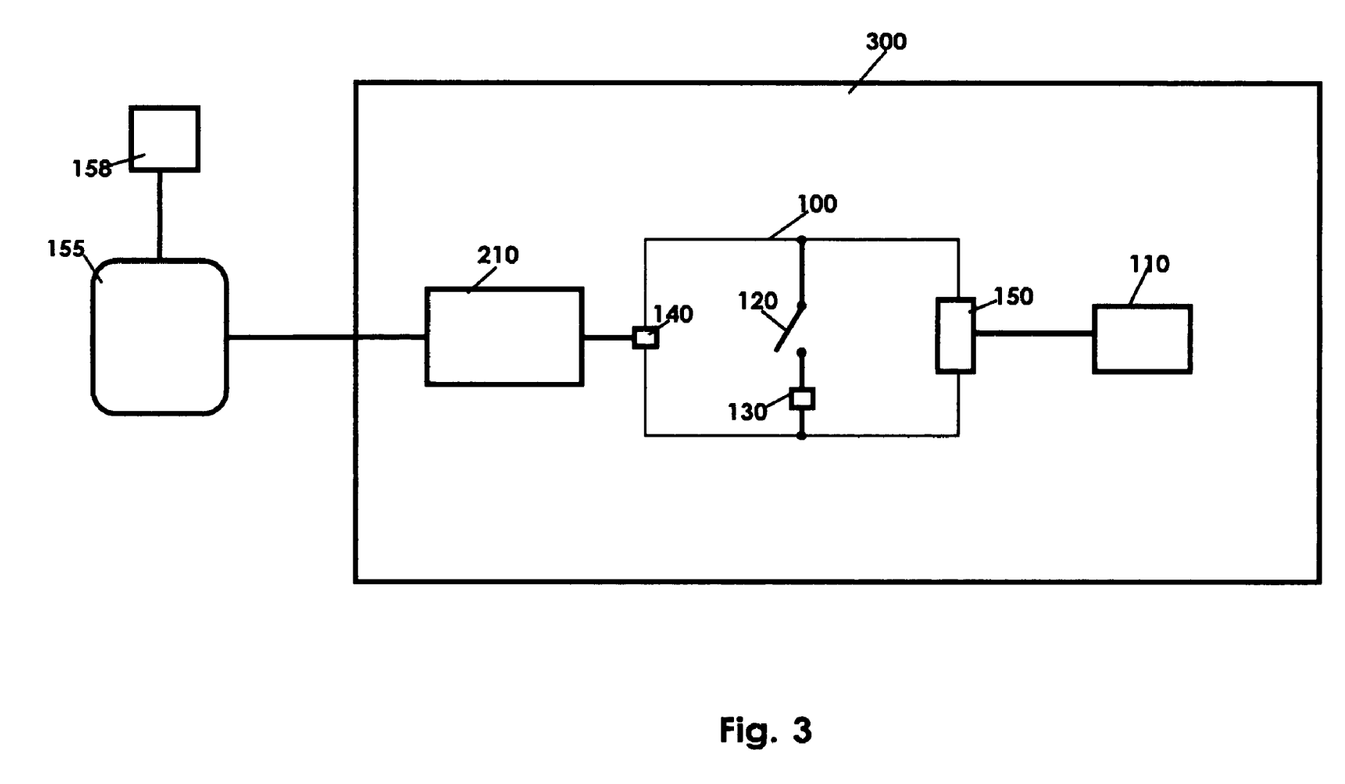
FIG. 3 is a communication system according to another embodiment of the present invention.

In another embodiment of the present invention, shown in FIG. 3, ring control device 100, answering machine 210, and telephone 110 are combined in a single unit 300. In certain embodiments, answering machine 200 can be programmed to play a particular message when switch 120 is in the on position and when answering machine 210 interrupts the incoming electrical signal. For example, the predetermined message may inform an incoming caller that the user is not accepting telephone calls at this time. However, as will be understood, the user can program any desired message.

In certain instances, a user may want telephone 110 to ring in an emergency even though ring control device 100 is enabled and switch 120 is in the on position. For example, a user may want a predetermined person, such as a relative to be able to override ring control device 100 and cause telephone 110 to ring even though ring control device 100 is enabled. This can be accomplished by providing the predetermined person with an override code. When the predetermined person hears the ring tone upon making a call to the user, the predetermined person can enter the override code using the keys on their telephone. In this embodiment, ring control device 100 also includes an electronic device (not shown) programmed to override or bypass voltage control device 130 when switch 120 is in the on position and when the incoming electronic signal includes the override code. Thus, the ringer on telephone 110 rings even when switch 120 is in the on position.

Figure 4:
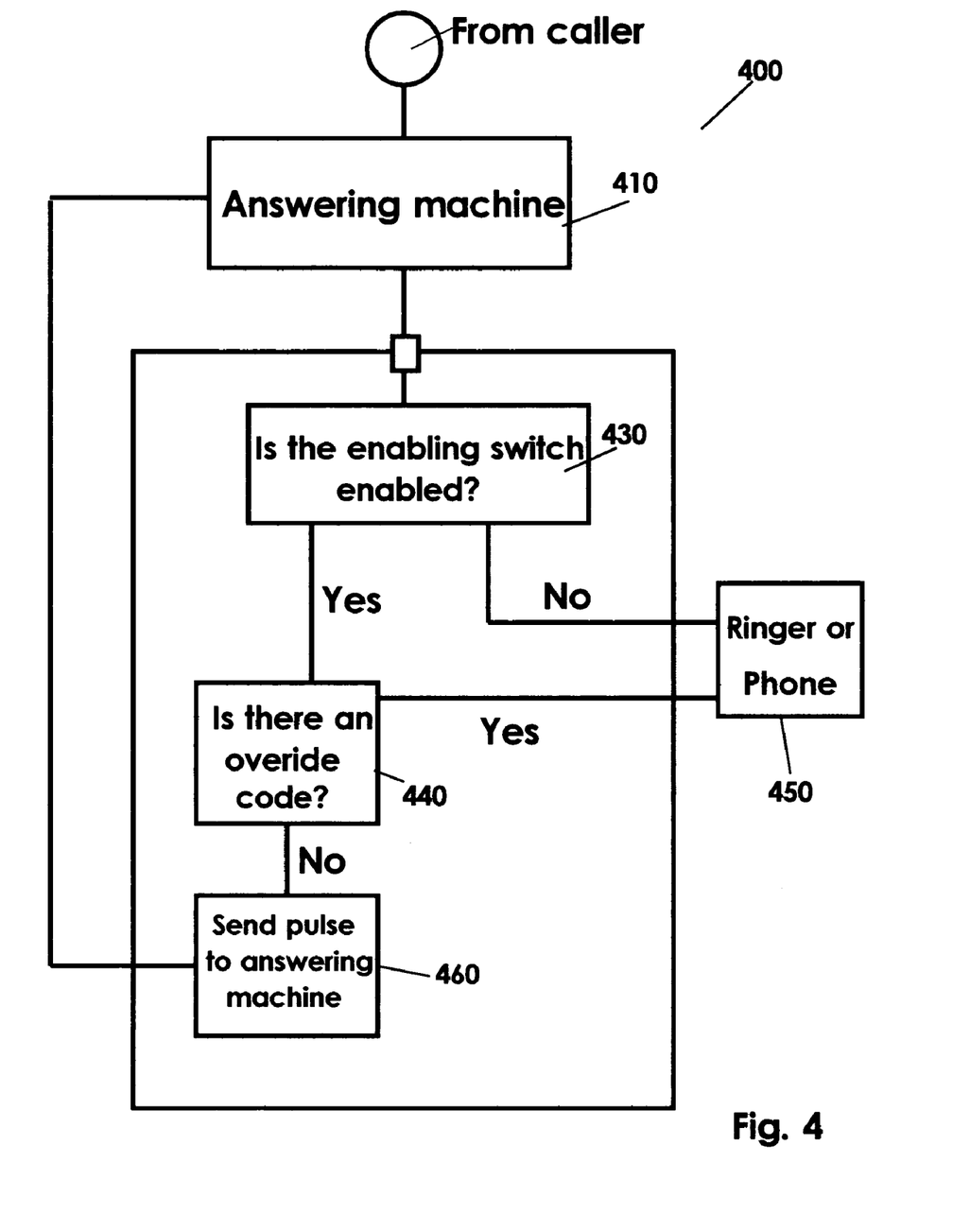
FIG. 4 is a high level flow chart for controlling the ringer on a telephone according to an embodiment of the present invention.
Figure 5:
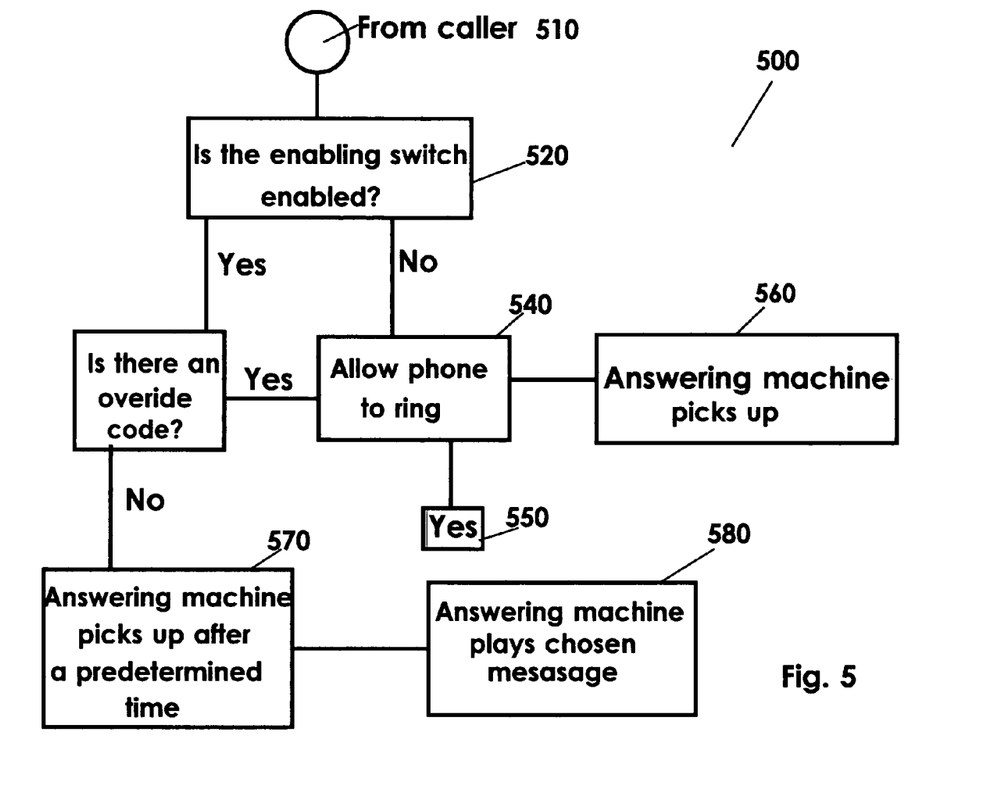
FIG. 5 is a high level flow chart for controlling the ringer on a telephone according to another embodiment of the present invention.

FIGS. 4 and 5 are high level flow charts that show how systems according to the present invention operate. FIG. 4 shows system 400 comprising ring control device 100 with a separate answering machine 210. In this embodiment, answering machine 210 receives an electrical signal originating from a caller at 410. The electrical signal passes through answering machine 210 and is received by first plug 140 of ring control device 100. At step 430, system 400 determines whether switch 120 is in the on position. If switch 120 is in the on position, ring control device next determines whether the electronic signal includes the override code, shown at 440. If ring control device 100 detects the override code at 440, the electronic signal is allowed to pass and telephone 110 is allowed to ring as shown at 450. However, if the electronic signal does not include the override code, ring control device 100 prevents telephone 110 from ringing and answering machine 210 interrupts the electronic signal after a predetermined period, plays a prerecorded message, and records a message from an incoming caller, shown at 460.

Alternatively, system 400 may not include answering machine 210. In this embodiment, the electrical signal from a caller is received by first plug 140 and routed to switch 120, shown at 430. If switch 120 is in the on position when first plug 140 receives the incoming electrical signal, ring control device 100 determines whether the electronic signal includes the override code, shown at 440. If ring control device 100 detects the override code at 440, the electronic signal is allowed to pass and telephone 110 is allowed to ring as shown at 450. However, if the electronic signal does not include the override code, ring control device 100 prevents telephone 110 from ringing.

FIG. 5 shows a system 500 where ring control device 100 and answering machine 210 are combined in unit 300. In this embodiment, unit 300 receives the incoming electronic signal at 510. System 500 determines whether switch 120 is in the on position at 520. If switch 120 is in the on position, ring control device next determines whether the electronic signal includes the override code, shown at 530. If there is an override code, the electronic device overrides voltage control device 130 and permits the electrical signal to pass and allows telephone 110 to ring, as shown at 540. If switch 120 is in off position, ring control device 100 permits telephone 110 to ring, also shown at 540.

If switch 120 is in the on position and ring control device 100 detects the override code at 530, telephone 110 rings and a user can answer telephone 110, shown at 550. Alternatively, if a user does not answer telephone 110, answering machine 210 can be programmed to interrupt the electronic signal, play the prerecorded message, and record a message from a caller, shown at 560.

If switch 120 is in the on position and there is no override code, ring control device 100 prevents telephone 110 from ringing and answering machine 210 interrupts the electronic signal after a predetermined period, shown at 570, and plays a prerecorded message, and records a message from an incoming caller, shown at 580.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A ring control device comprising:
   a switch;
   a voltage control device in electrical series with the switch;
   a first plug for receiving a first electrical signal from an outside caller, the first electrical signal comprising a communication voltage and a ring voltage, the first plug disposed in series with and before the voltage control device; and
   a second plug for outputting at least one of the communication and ring voltages of the first electrical signal from the outside caller, the second plug disposed in series with and after the switch;
   wherein the voltage control device prevents one of the communication and ring voltages from passing to the second plug when the switch is in a predetermined position.

2. A ring control device according to claim 1, wherein the voltage control device is selected from at least one of a Zener diode and a capacitor.

3. A ring control device according to claim 2, wherein the ring voltage is different from the communication voltage, and wherein a second electrical signal received by the second plug is passed to the first plug when the switch is in the predetermined position, and wherein the ring control device ring control device is electrically connected to a telephone and the ring control device silences a ringer of the telephone without preventing outgoing calls to be placed.

4. A ring control device according to claim 3, wherein the ring voltage is greater than about 40 volts.

5. A ring control device according to claim 3, wherein the second voltage communicates with a ringer of a telephone.

6. A ring control device according to claim 1, wherein the switch is controlled by a timer.

7. A ring control device according to claim 1, further comprising:
   a signal receiving device electrically connected to the switch for receiving a control signal to switch the switch into, and out of the predetermined position.

8. A ring control device according to claim 7, wherein the signal receiving device receives a signal selected from at least one of an IR signal and a RF signal.

9. A ring control device according to claim 1 further comprising:
   a first indicator light electrically in parallel with the voltage control device, wherein the first indicator light is illuminated when the switch is in the predetermined position.

10. A ring control device according to claim 1 further comprising:
    a second indicator light electrically connected in series with and before the voltage control device, wherein the second indicator light is illuminated when the first plug receives the first electrical signal.

11. A ring control device according to claim 1 further comprising:
    an electric signal processor in series with and before the voltage control device, the electric signal processor capable of identifying a breakthrough code and configured to permit the first electrical signal from the outside caller to pass to the second plug when the first electrical signal from the outside caller includes the breakthrough code and when the switch is in the predetermined position.

12. A communication system comprising:
    a telephone, wherein the telephone has a ringer;
    a switch is in electrical communication with the telephone;
    a voltage control device in electrical series with the switch;
    a first plug for receiving a first electrical signal from an outside caller in series with and before the voltage control device, wherein the electrical signal from an outside caller comprises a communication voltage and a ring voltage; and
    a second plug for outputting at least a portion of the electrical signal in series with and after the switch;
    wherein the voltage control device prevents one of the communication and ring voltages from passing to the ringer when the switch is in a predetermined position.

13. A communication system according to claim 12 further comprising:
    an answering machine, wherein the answering machine is in electrical communication with the telephone.

14. A communication system according to claim 12 further comprising:
    a first indicator light electrically connected in parallel with the voltage control device, wherein the first indicator light is illuminated when the switch is in the predetermined position.

15. A communication system according to claim 12 wherein the switch is controlled by a timer.

16. A communication system according to claim 12 further comprising:
    a second indicator light electrically connected in series with and before the voltage control device, wherein the second indicator light is illuminated when the first plug receives the first electrical signal from the outside caller.

17. A communication system according to claim 12 further comprising:
    an electric signal processor in series with and before the voltage control device, the electric signal processor capable of identifying a breakthrough code and configured to permit the first electrical signal from the outside caller to pass to the second plug when first electrical signal includes the breakthrough code and when the switch is in the predetermined position, and wherein the voltage control device prevents the ringer of the telephone from ringing without preventing outgoing calls to be placed.

18. A method of controlling a ringer on a telephone, the method comprising the steps of:

providing an enablement switch, the enablement switch having at least two positions;

providing a first plug that receives an incoming electrical signal from an outside caller, wherein the incoming electrical signal comprises a communication voltage less than 40 V and a ring voltage greater than 40 V;

blocking the ring voltage from communicating with a second plug when the enablement switch is in a predetermined position; and permitting an outgoing electrical signal received by the second plug to communicate with the first plug when the enablement switch is in the predetermined position.

19. A method of controlling a ringer on a telephone according to claim 18, the method further comprising the step of:

providing an electric signal processor in series with and before the voltage control device, the electric signal processor capable of identifying a breakthrough code and configured to permit the first electrical signal from the outside caller to pass to the second plug when the first electrical signal includes the breakthrough code and when the switch is in the predetermined position, and wherein the ringer of the telephone is silenced without preventing outgoing calls to be placed.

20. A method of controlling a ringer on a telephone according to claim 18, the method further comprising the step of:

providing an answering machine;

providing an electrical switch that outputs a predetermined electric signal stored in the answering machine when the enablement switch is in the predetermined position.

* * * * *